United States Patent
Smith et al.

(10) Patent No.: US 11,325,070 B1
(45) Date of Patent: May 10, 2022

(54) CATALYTIC REACTOR

(71) Applicant: PRECISION COMBUSTION INC., North Haven, CT (US)

(72) Inventors: Warren F Smith, Enfield, CT (US); Jeffrey G Weissman, Guilford, CT (US); Prayush Singh, Mansfield, CT (US)

(73) Assignee: Precision Combustion, Inc., North Haven, CT (US)

( * ) Notice: Subject to any disclaimer, the term of this patent is extended or adjusted under 35 U.S.C. 154(b) by 0 days.

(21) Appl. No.: 17/097,016

(22) Filed: Nov. 13, 2020

Related U.S. Application Data

(60) Provisional application No. 62/945,297, filed on Dec. 9, 2019.

(51) Int. Cl.
 *C01B 32/40* (2017.01)
 *B01J 35/04* (2006.01)
 (Continued)

(52) U.S. Cl.
 CPC .......... *B01D 53/864* (2013.01); *B01J 35/023* (2013.01); *B01J 35/04* (2013.01); *C01B 32/40* (2017.08); *B01D 2255/904* (2013.01); *B01D 2255/9202* (2013.01); *B01D 2255/9205* (2013.01); *B01D 2257/502* (2013.01)

(58) Field of Classification Search
 CPC ... C10G 2/30; C10G 2/32; C10G 2/34; C10G 2/341; C10G 2/40; C10G 2/50; C01B 3/26; C01B 3/32; C01B 3/38; C01B 3/384; B01J 19/00; B01J 19/2425; B01J 2219/00; B01J 2219/0072; B01J 2219/00873; B01J 2219/0088
 See application file for complete search history.

(56) References Cited

U.S. PATENT DOCUMENTS

| | | |
|---|---|---|
| 4,083,695 A | 4/1978 | Haese |
| 5,051,241 A | 9/1991 | Pfefferle |

(Continued)

FOREIGN PATENT DOCUMENTS

| | | |
|---|---|---|
| EP | 3212323 B1 | 10/2018 |
| WO | WO 2010/014217 A1 | 2/2010 |
| WO | WO 2017/102096 A1 | 6/2017 |

OTHER PUBLICATIONS

C. Perego, R. Bortolo, R. Zennaro, "Gas to Liquids Technologies for Natural Gas Reserves Valorization: The Eni Experience," Catalysis Today, 142 (2009) 9-16.

(Continued)

*Primary Examiner* — Timothy C Vanoy
(74) *Attorney, Agent, or Firm* — Marie Zuckerman; Andrew D. Gathy

(57) ABSTRACT

A catalytic reactor constructed of a thermally conductive housing defining a reaction zone having disposed therein: (a) a plurality of catalytic elements, each comprising a porous material having a catalyst supported thereon, and (b) a plurality of heat transfer elements, each comprising a porous, thermally conductive, and essentially catalytically inactive material; wherein the plurality of catalytic elements and the plurality of heat transfer elements are disposed in an alternating configuration within the reaction zone. The catalytic reactor is useful in chemical reactions where heat transfer is a rate limiting step.

24 Claims, 11 Drawing Sheets

(51) Int. Cl.
*B01J 35/02* (2006.01)
*B01D 53/86* (2006.01)

(56) References Cited

U.S. PATENT DOCUMENTS

| | | | |
|---|---|---|---|
| 6,156,444 | A | 12/2000 | Smith |
| 6,328,936 | B1 | 12/2001 | Roychoudhury |
| 6,558,634 | B1* | 5/2003 | Wang ............... B01J 19/0093 |
| | | | 422/173 |
| 6,616,909 | B1* | 9/2003 | Tonkovich ........... B01J 8/0285 |
| | | | 423/648.1 |
| 6,955,792 | B2 | 10/2005 | Filippi |
| 7,141,092 | B1 | 11/2006 | Roychoudhury |
| 8,603,407 | B2 | 12/2013 | Pfefferle |
| 9,446,365 | B2 | 9/2016 | Junaedi |
| 10,076,739 | B1 | 9/2018 | Weissman |
| 2005/0271563 | A1* | 12/2005 | Yang ..................... C01B 3/384 |
| | | | 422/600 |
| 2010/0022785 | A1 | 1/2010 | Hechler |
| 2010/0276336 | A1 | 11/2010 | Ferschneider |
| 2014/0109976 | A1* | 4/2014 | Mathias ............... F28D 9/0093 |
| | | | 137/1 |
| 2016/0052853 | A1 | 2/2016 | Dubois |
| 2018/0327262 | A1* | 11/2018 | Adams, II ............. C01B 3/48 |

OTHER PUBLICATIONS

C. Visconti, E. Tronconi, L. Lietti, G. Groppi, P. Forzatti, C. Cristiani, R. Zennaro, S. Rossinni, "An Experimental Investigation of Fischer-Tropsch Synthesis Over Washcoated Metallic Structured Supports," Applied Catalysis A: General, 370 (2009) 93-101.

Co-Pending unpublished, U.S. Appl. No. 16/273,234, filed Feb. 12, 2019, entitled "Process for Converting Alkanes to Olefins," Applicant: Precision Combustion, Inc.

Co-Pending unpublished, U.S. Appl. No. 17/015,796, filed Sep. 9, 2020, entitled "Regenerable Adsorbent System," Applicant: Precision Combustion Inc.

Co-Pending unpublished, U.S. Appl. No. 17/097,048, filed Nov. 13, 2020, entitled : Catalytic Solar Reactor, Applicant: Precision Combustion, Inc.

* cited by examiner

CATALYTIC REACTOR

CROSS-REFERENCE TO RELATED APPLICATIONS

This application claims benefit of U.S. provisional patent application No. 62/945,297, filed Dec. 9, 2019.

GOVERNMENT RIGHTS

This invention was made with support from the U.S. Government under Contract No. DE-SC0015855, sponsored by the Department of Energy. The U.S. Government has certain rights in this invention.

FIELD OF THE INVENTION

This invention pertains to a catalytic reactor apparatus for use in endothermic and exothermic chemical reactions. This invention also pertains to a first process of operating an endothermic chemical reaction and further pertains to a second process of operating an exothermic chemical reaction.

BACKGROUND OF THE INVENTION

To sustain an endothermic chemical reaction, heat must be supplied into a reaction zone of a chemical reactor. The reaction zone typically houses a catalyst facilitating the chemical reaction. In such endothermic reactions, undesirable chemical byproducts may be produced, or the extent of reaction to desired products may be limited, if the reaction temperature drops unacceptably low. Consequently, heat may be needed to maintain a higher temperature so as to retard formation of undesirable side reactions and to facilitate reaction to desired products. The prior art teaches preheating chemical reactants entering a chemical reactor to provide the required heat for the endothermic reaction. This procedure, however disadvantageously, allows chemical reactants to enter the reactor at an unacceptably elevated temperature, which might damage catalytic elements at a front end of the reactor while also potentially inducing additional undesirable side reactions with formation of additional chemical byproducts. Additionally, limits may need to be imposed on the elevated temperature of the preheated chemical reactants due to constraints on the reactor's materials of construction. Moreover, in catalyzed endothermic reactions, the temperature of the catalyst decreases along the reaction flow path from inlet to outlet of the reactor. This non-uniformity in temperature along the reaction flow path may result in conversion losses and additional formation of undesirable byproducts.

Exothermic chemical reactions generate heat. In some instances, the generated heat may be sufficient to sustain ongoing reaction. In other instances, the generated heat may not be sufficient to sustain ongoing reaction, thus some degree of heat may need to be input. In any case, efficient removal of heat is required to control the reaction temperature, so as to avoid excessive heat build-up and undesirable exotherms as well as over-reaction to undesirable chemical byproducts.

For an energetic reaction, regardless of its being endothermic or exothermic, the rate limiting step may be energy transport (heat transfer) to the reactants or energy transport from the reaction zone, rather than mass transport to reaction sites (diffusion limitation) or reaction rate (kinetics limitation). In such cases where energy transfer is the rate limiting step, it is beneficial to hold the reaction within a specified temperature range so as to avoid any undesirable side reactions and formation of undesirable chemical byproducts. It is also desirable to avoid loss of reactor control due to excess endotherms or exotherms and to avoid damage to the reactor or its internal components due to unacceptably high or low temperatures.

A catalytic reactor comprising a porous mesh substrate having a catalyst supported thereon is known in the art, as exemplified by U.S. Pat. No. 5,051,241. The substrate is provided in the form of a mesh or screen comprising a solid framework defining a plurality of pores or channels having an ultra-short-channel-length. The term "ultra-short-channel-length" generally refers to a channel or pore of a length ranging from about 25 microns to about 500 microns. In one embodiment, such reactors are constructed by close-packing a stack of mesh sheets such that chemical reactants fed into one end of the stack flow linearly through the stack exiting at an opposite end of the stack. In another embodiment, one sheet of mesh substrate is tightly rolled into a cylindrical coil such that chemical reactants are fed into the center of the coil at an inner diameter, then flow radially outward exiting at an outer diameter of the coil. Heat transfer into and out of such ultra-short-channel-length porous mesh substrates may fall short of optimal transfer rates resulting in temperature excursions outside the desirable range of operating temperatures, thereby potentially leading to formation of undesirable byproducts and damage to the reactor.

The prior art also teaches a catalytic reactor with an auxiliary heating structure for promoting an endothermic chemical reaction, as exemplified by U.S. Pat. No. 6,328, 936. This prior art reactor employs multiple electrical heating elements electrically isolated from one another by insulators that are an integral part of the flow path. The heater elements and at least one of the insulator elements are catalytically active. This prior art apparatus requires electrical connections and a source of electricity, operates via active electrical resistive heating, and is not intended for use inside a conventional furnace or with a solar powered furnace.

In view of the above, it would be desirable to design a novel chemical reactor with improved heat transfer properties for better temperature control in endothermic and exothermic reactions. It would be desirable if the design were applicable to a catalytic chemical reactor constructed with an ultra-short-channel-length porous substrate. Even more desirably, the reactor should not require electrical structures and active electrical resistive heating; but rather, the reactor should employ passive heat transfer via conduction and should be capable of use in a conventional furnace or with a solar powered furnace. Any new design should not come at a cost to conversion of reactants or product selectivity.

SUMMARY OF THE INVENTION

In one aspect, this invention provides for a novel catalytic reactor comprising a thermally-conductive housing having disposed therein the following structures:
  (a) a plurality of catalytic elements, each catalytic element comprising a porous material having a catalyst supported thereon, each catalytic element further comprising a first flowpath from a first inlet side to a first outlet side;
  (b) a plurality of heat transfer elements, each heat transfer element comprising a porous, thermally-conductive material substantially lacking catalytic activity; each heat transfer element further comprising a second flow-path from a second inlet side to a second outlet side; and further wherein the plurality of catalytic elements and the plurality of heat transfer elements are disposed within the thermally-conductive housing in an alternating configuration defining a fluid flow path from each element inlet side to each element outlet side.

It should be appreciated that the catalytic reactor of this invention is intended, in one application, for use in endothermic reactions wherein heat is provided externally and passively to the plurality of catalytic elements. The words "externally and passively" mean that heat is provided to the plurality of catalytic elements via conduction from an external heat source to the thermally-conductive housing, and from there to the plurality of heat transfer elements within the housing. Thereafter, heat is transferred within the housing via conduction from the heat transfer elements to the catalytic elements. As a consequence, heat is not generated by structures within the reactor itself; for example, resistive heating via electrical circuitry is not a structure of or provided internally to the reactor. Rather, the catalytic reactor is intended to be heated through the thermally-conductive housing by means of heat generated externally, for example, in a furnace via combustion, or by steam, or by a heat transfer fluid, or by a solar powered furnace, the latter comprising concentrated solar heat typically via a plurality of mirrors.

The design of this invention improves the performance of a catalytic reactor, preferably, an ultra-short-channel-length catalytic reactor, useful in endothermic and exothermic chemical reactions. It is again noted that in endothermic catalytic reactions heat is required to be supplied to a catalytic substrate to sustain the chemical reaction. Typically, the ultra-short-channel-length catalytic reactor of the prior art consists of a plurality of thin, closely-packed screens or meshes having a catalyst supported thereon, thereby resulting in a limited area for heat to be conducted inward from an external wall or housing of the reactor. In this invention, by positioning a set of essentially non-catalytic heat transfer elements between every two sets or pair of catalytic elements, heat is conducted facilely through the housing of the reactor and is supplied more efficiently to each of the catalytic elements along the reaction pathway. Enhanced heat transfer allows the chemical reaction to take place at higher temperatures, and therefore promotes higher conversions of reactants along the reaction flow path. Moreover, the catalytic reactor of this invention can be beneficially applied to specific chemical reactions where carbon forms at lower temperatures on the catalytic elements and causes catalyst deactivation. In such cases, insertion of a set of essentially non-catalytic heat transfer elements between every two sets of catalytic elements, as required of this invention, sustains higher reaction temperatures thereby retarding carbon formation and catalyst deactivation.

For a reaction limited by heat transfer and not limited by mass transfer or kinetics, increasing the rate of heat transfer significantly facilitates reaction rate. In this invention facilitation of heat transfer is accomplished via intercalation of the heat transfer elements in between the catalytic elements. Surprisingly, we have discovered that a percentage of catalytic elements of the prior art reactors can be removed and replaced with heat transfer elements, thereby reducing the local catalytic reaction and limiting the local endothermic temperature drop, while still advantageously maintaining essentially the same volumetric reactivity with improved product quality. Unexpectedly, higher levels of reactant conversions were achieved, and undesired side reactions resulting in carbon deposition were avoided. In addition, lesser amounts of catalyst were beneficially required.

In one embodiment, the catalytic reactor of this invention was successfully employed in an endothermic process of dry reforming carbon dioxide, by reacting carbon dioxide with methane, to produce synthesis gas comprising a mixture of hydrogen and carbon monoxide, as seen in Eqn. (1):

$$CO_2 + CH_4 \rightarrow 2H_2 + 2CO \quad \text{(Eqn. 1)}$$

Under operating conditions, in the subject apparatus of this invention where the essentially non-catalytic heat transfer elements were interspersed between the catalytic elements, carbon formation was significantly reduced while significantly increasing methane conversion. By comparison, under similar operating conditions in a conventional packed-bed reactor with only closely-spaced catalytic elements and no heat transfer elements, the catalyst deactivated and the reforming reaction ceased.

Additional endothermic processes capable of being conducted in the apparatus of this invention include, but are not limited to, the following embodiments illustrated in Equations 2-5. Combinations of these processes can also be employed.

Reverse water gas shift in which a mixture of carbon dioxide and hydrogen is converted into a mixture of carbon monoxide and water:

$$CO_2 + H_2 \rightarrow CO + H_2O \quad \text{(Eqn. 2)}$$

Methane steam reforming in which a mixture of methane and water is converted into synthesis gas:

$$CH_4 + H_2O \rightarrow CO + 3H_2 \quad \text{(Eqn. 3)}$$

Steam reforming of hydrocarbons in which a hydrocarbon or mixture thereof is converted in the presence of water to synthesis gas:

$$C_nH_m + nH_2O \rightarrow nCO + (n+m/2)H_2 \quad \text{(Eqn. 4)}$$

Carbon dioxide reforming of hydrocarbons in which a hydrocarbon or mixture thereof is converted in the presence of carbon dioxide to synthesis gas:

$$C_nH_m + nCO_2 \rightarrow 2nCO + (m/2)H_2 \quad \text{(Eqn. 5)}$$

Accordingly, in another aspect this invention provides for a process of operating an endothermic reaction, comprising:
(a) providing a catalytic reactor comprising a thermally-conductive housing having disposed therein the following structures:
(a)(i) a plurality of catalytic elements, each catalytic element comprising a porous material having a catalyst supported thereon, each catalytic element further comprising a first flow path from a first inlet side to a first outlet side;
(a)(ii) a plurality of heat transfer elements, each heat transfer element comprising a porous, thermally-conductive material substantially lacking catalytic activity, each heat transfer element further comprising a second flow path from a second inlet side to a second outlet side; and
(a)(iii) further wherein the plurality of catalytic elements and the plurality of heat transfer elements are disposed within the thermally-conductive housing in an alternating configuration defining a fluid flow path from each element inlet side to each element outlet side;
(b) providing heat conductively from the thermally conductive housing to the heat transfer elements, so as to transfer heat to the catalytic elements;

(c) feeding a reactant stream through the fluid flow path from each element inlet side to each element outlet side; and (d) contacting the reactant stream with the catalyst as the reactant stream passes through the plurality of catalytic elements, the contacting occurring under process conditions sufficient to produce a product stream.

Alternatively, the catalytic reactor of this invention is also useful in exothermic reactions where heat generated by the chemical reaction itself is required to be removed efficiently so as to maintain an appropriate reaction temperature. In this instance, heat generated by the exothermic reaction is facilely removed from the reactor through the plurality of heat transfer elements. In one embodiment, the catalytic reactor of this invention was successfully employed in an exothermic Fisher-Tropsch process of converting synthesis gas to C1-24+ liquid hydrocarbons, as exemplified by Eqn. (6):

$nCO+(2n+1)H_2 \rightarrow C_nH_{2n+2}+nH_2O$  (Eqn. 6)

A specific embodiment of the aforementioned Fisher-Tropsch process is illustrated in the synthesis of hexane as shown in Eqn. (7):

$6CO+13H_2 \rightarrow C_6H_{14}+6H_2O$  (Eqn. 7)

Accordingly, this invention provides for a process of operating an exothermic reaction, comprising:

(a) providing a catalytic reactor comprising a thermally-conductive housing having disposed therein the following structures:

(a)(i) a plurality of catalytic elements, each catalytic element comprising a porous material having a catalyst supported thereon, each catalytic element further comprising a first flow path from a first inlet side to a first outlet side;

(a)(ii) a plurality of heat transfer elements, each heat transfer element comprising a porous, thermally-conductive material substantially lacking catalytic activity, each heat transfer element further comprising a second flow path from a second inlet side to a second outlet side; and (a)(iii) wherein the plurality of catalytic elements and the plurality of heat transfer elements are disposed in an alternating construction within the thermally conductive housing defining a fluid flow path from each element inlet side to each element outlet side;

(b) feeding a reactant stream through the fluid flow path from each element inlet side to each element outlet side;

(c) contacting the reactant stream with a catalyst as the reactant stream passes through the plurality of catalytic elements, the contacting occurring under process conditions sufficient to produce a product stream and a heat of reaction; and (d) conductively transferring the heat of reaction to the plurality of porous thermally conductive heat transfer elements and thence to the thermally conductive housing, so as to remove heat from the reactor.

DRAWINGS

DETAILED DESCRIPTION OF THE INVENTION

Figure 1:
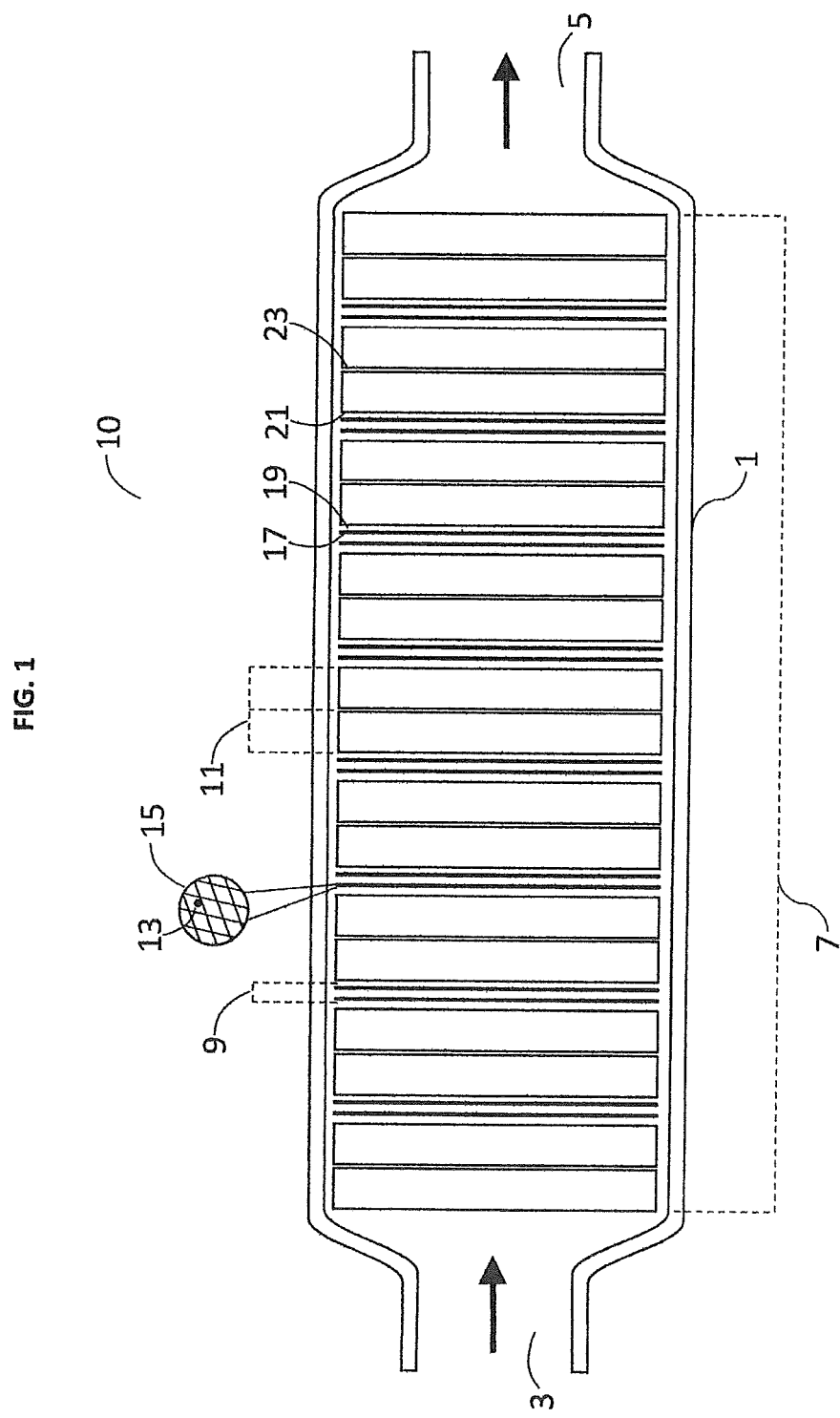
FIG. 1 illustrates an embodiment of the apparatus of this invention.

In one embodiment, this invention provides for a novel catalytic reactor comprising a thermally-conductive housing having disposed therein the following structures:

(a) a plurality of catalytic elements, each catalytic element comprising a porous mesh having an ultra-short-channel-length and having a catalyst supported thereon, each of the plurality of catalytic elements further comprising a first flow path from a first inlet side to a first outlet side;

(b) a plurality of heat transfer elements, each heat transfer element comprising a porous, thermally-conductive material substantially lacking catalytic activity; each heat transfer element further comprising a second flow path from a second inlet side to a second outlet side; and each heat transfer element being independently selected from the structural group consisting of monoliths and ultra-short-channel-length meshes of metallic composition;

further wherein the plurality of catalytic elements and the plurality of heat transfer elements are disposed in an alternating construction within the thermally conductive housing so as to define a fluid flow path from each element inlet side to each element outlet side.

The phrase "substantially lacking catalytic activity," as it pertains to the heat transfer elements, means that the heat transfer elements, irrespective of whether or not they contain quantities of catalyst, do not exhibit catalytic activity in the subject chemical process sufficient to influence conversion of reactants or selectivity to products. In one embodiment, essentially no catalyst is present on the heat transfer elements, and catalytic activity from the heat transfer elements is non-detectable. In another embodiment, catalyst is present on the heat transfer elements but in a non-effective quantity, typically on the order of less than 0.5 percent by weight, and preferably, less than about 0.05 percent by weight, such that catalytic facilitation of overall process conversion and selectivity is less than about 2 percent, preferably, less than about 1 percent.

As used throughout this description, the term "alternating construction" means that along the fluid flow path each set of catalytic elements is bracketed on opposite ends by at least one heat transfer element; and conversely, each set of heat transfer elements is bracketed on opposite ends by at least one catalytic element; hence in alternating fashion. It should be appreciated that "a set of catalytic elements" consists of any operable number of catalytic elements. Likewise, "a set of heat transfer elements" consists of any operable number of heat transfer elements. The number of catalytic elements or heat transfer elements in any selected set may be the same or different from the number of such elements in any other selected set.

It should be appreciated that there is no limitation on whether the alternating construction begins at the front end (upstream end/inlet end) of the reactor with a catalytic element or a heat transfer element. In one embodiment particularly advantageous for endothermic reactions, the alternating construction begins at the front end of the reactor with a heat transfer element. In endothermic reactions, the reactants typically need preheating before reaction is able to commence. Accordingly, starting the alternating construction with a heat transfer element provides preheat to the chemical reactants. In another embodiment advantageous for exothermic reactions, the alternating construction begins at the front end of the reactor with a catalytic element. In exothermic reactions, the reaction itself generates heat, so preheat of reactants may be unnecessary.

As noted hereinbefore, the apparatus of this invention was successfully employed in an endothermic process of dry reforming carbon dioxide to produce a mixture of hydrogen and carbon monoxide (synthesis gas). In this embodiment, this invention provides for a process of dry reforming carbon dioxide comprising:
 (a) providing a catalytic reactor comprising a thermally conductive housing having disposed therein the following structures:
 (a)(i) a plurality of catalytic elements, each catalytic element comprising a porous catalytic mesh comprising an ultra-short-channel-length mesh having a methane reforming catalyst supported thereon, each of the catalytic elements further comprising a first flow path from a first inlet side to a first outlet side;
 (a)(ii) a plurality of heat transfer elements, each heat transfer element comprising a porous, thermally-conductive material substantially lacking catalytic activity, each of the heat transfer elements further comprising a second flow path from a second inlet side to a second outlet side; wherein further each heat transfer element is selected from the group consisting of monoliths and ultra-short-channel-length meshes of metallic composition;
 (a)(iii) wherein the plurality of catalytic elements and the plurality of heat transfer elements are disposed in an alternating construction within the thermally conductive housing so as to define a fluid flow path from each element inlet side to each element outlet side;
 (b) providing heat conductively from the thermally conductive housing to the heat transfer elements, so as to provide heat to the catalytic elements;
 (c) feeding a reactant stream comprising methane and carbon dioxide through the fluid flow path from each element inlet side to each element outlet side; and
 (d) contacting the reactant stream with the methane reforming catalyst as the reactant stream passes through the plurality of catalytic elements, the contacting occurring under process conditions sufficient to produce a product stream comprising hydrogen and carbon monoxide.

Allowing the reformation of carbon dioxide to proceed in a conventional manner, without the adequate energy input described in this invention, results in the reaction proceeding at close to equilibrium control, at least initially nearest the inlet (upstream) end of the reactor. Since the reaction is endothermic, the temperature of the reactant mixture and the catalyst bed decreases undesirably along the reaction flow path. Eventually, either the temperature drops sufficiently to enter an undesirable reaction regime leading to carbon formation or conversion loss, or the reaction becomes kinetically limited due to lowered temperatures and is quenched. In either case, the conventional outcome is undesirable. By contrast, the process of this invention allows for improved heat transfer via external heating and improved conduction to the catalytic elements and reactants along the entire reaction flow path, thereby improving conversion and reducing detrimental carbon formation.

As noted hereinbefore, the apparatus of this invention was also successfully employed in an exothermic process, as a representative example, a Fisher-Tropsch process of converting synthesis gas comprising hydrogen and carbon monoxide into a mixture of C1-24+ liquid hydrocarbons. Thus, as a representative reaction, this invention provides for a Fisher-Tropsch process comprising:
 (a) providing a catalytic reactor comprising a thermally conductive housing having disposed therein the following structures:
 (a)(i) a plurality of catalytic elements, each catalytic element comprising a mesh having an ultra-short-channel-length and having a Fisher-Tropsch catalyst supported thereon, each of the catalytic elements further comprising a first flow path from a first inlet side to a first outlet side;
 (a)(ii) a plurality of heat transfer elements, each of the plurality of heat transfer elements comprising at least one porous, thermally-conductive material substantially lacking catalytic activity, each of the plurality of heat transfer elements further comprising a second flow path from a second inlet side to a second outlet side; further wherein each of the plurality of heat transfer elements is selected from the structural group consisting of monoliths and ultra-short-channel-length meshes of metallic composition;
 (a)(iii) wherein the plurality of catalytic elements and the plurality of heat transfer elements are disposed in an alternating construction within the thermally conductive housing defining a fluid flow path from each element inlet side to each element outlet side;
 (b) feeding a reactant stream comprising carbon monoxide and hydrogen through the fluid flow path from each element inlet side to each element outlet side;
 (c) contacting the reactant stream with the Fisher-Tropsch catalyst as the reactant stream passes through the plurality of catalytic elements, the contacting occurring under process conditions sufficient to produce a product stream comprising a mixture of C1-24+ liquid hydrocarbons and a heat of reaction; and (d) transferring the heat of reaction conductively to the heat transfer elements and thence to the thermally conductive housing, so as to remove heat of reaction from the reactor.

The apparatus and processes of this invention are more fully realized and appreciated in a description of the following figures. FIG. 1 illustrates in transverse longitudinal view an embodiment 10 of the catalytic reactor of this invention comprising a tubular thermally conductive housing 1 having an inlet end 3 for feeding a reactant flow stream into a reaction zone 7 and an outlet end 5 for exhausting a product stream from the reaction zone 7. The reaction zone 7 is filled with a plurality of porous catalytic elements 9 and a plurality of porous thermally conductive heat transfer elements 11, alternatingly disposed along the length of the reaction zone 7. In this embodiment, the catalytic elements 9 consist of a mesh sheet 15 having a catalyst 13 supported thereon; and each catalytic element 9 also comprises a first inlet side 17 and a first outlet side 19 defining a first flow path. Each heat transfer element 11 comprises a second inlet side 21 and a second outlet side 23 defining a second flow path. Accordingly, a fluid flow path from the inlet 3 through to the exit 5 of the reaction zone 7 is made possible by the flow paths through each catalytic element 9 and heat transfer element 11. In the embodiment of FIG. 1, the catalytic elements 9 are distributed in equal number and volume along the length of the reaction zone 7; and likewise, the heat transfer elements 11 are distributed in equal number and volume along the reaction zone 7. Moreover, the catalytic elements 9 and the heat transfer elements 11 are disposed in a regular or periodic fashion within the thermally conductive housing 1.

Figure 2:
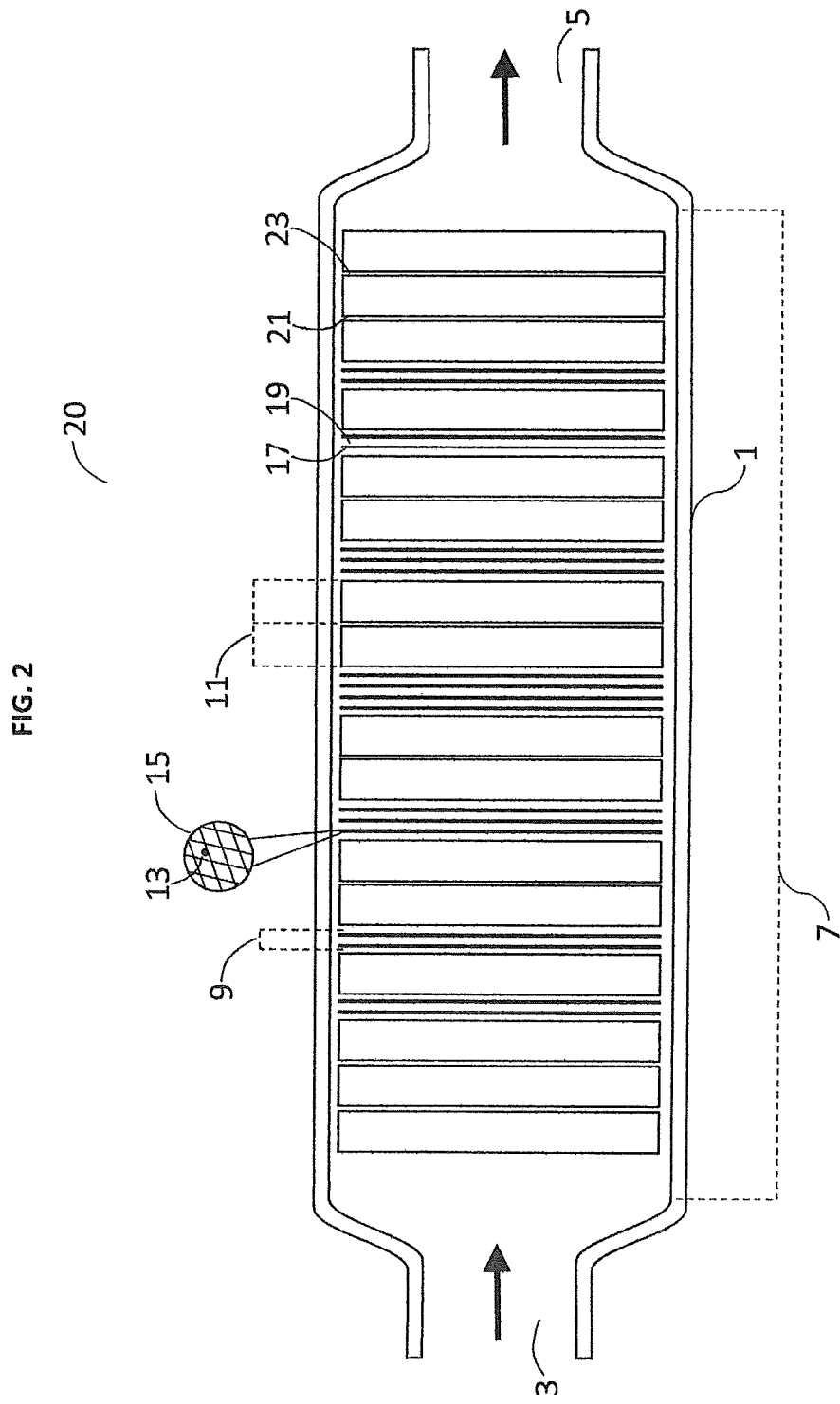
FIG. 2 illustrates another embodiment of the apparatus of this invention.

FIG. 2 illustrates another embodiment 20 of the apparatus of this invention. FIG. 2 is identical to FIG. 1 in all regards, with the exception that the arrangement of catalytic elements 9 within the thermally conductive housing 1 is irregular or non-periodic, both in longitudinal arrangement along the reaction zone 7 as well as in number of elements within each set.

The catalytic reactor of this invention comprises a housing constructed of a material having acceptable thermal conductivity and durability under the intended operating temperatures. Typically, metallic materials will provide an acceptable thermal conductivity (conductive heat transfer) as well as durability. Non-limiting examples of suitable housing materials include copper, aluminum, titanium, niobium, and standard and high temperature stainless steels, iron-chromium alloys, iron-chromium-aluminum alloys including FeCrAlY, Ni-chrome, and nickel-chromium-aluminum alloys (NiCrAlY). The housing comprises a wall having an exterior face and an interior face, the latter defining an interior plenum that defines a reaction zone. The reaction zone contains and supports the plurality of catalytic elements and plurality of heat transfer elements. The housing further comprises at least one inlet for feeding into the reaction zone one or more fluid streams notably of chemical reactants as well as an outlet for exiting from the reaction zone a fluid stream comprising reaction product(s). The at least one inlet and outlet are constructed of any conventional design suitable for the chemical flows and temperatures applicable for the intended use.

Each catalytic element housed within the reaction zone comprises at least one porous material having a catalyst supported thereon. One side of the porous material is defined as an inlet side for the purposes of fluid flow; whereas an opposite side of the porous material is defined as an outlet side for the purposes of fluid flow. In one embodiment, the porous material comprises a mesh, that is, a reticulated net or screen, constructed from a solid framework structure defining a plurality of pores, cells, or channels. In one embodiment, the porous mesh is characterized by an ultra-short-channel-length, defined as a length ranging from about 25 microns to about 500 microns from inlet side to outlet side. The porous material is typically constructed from any material capable of withstanding the intended operating temperatures, which generally range from about 150° C. to about 1,400° C. depending upon the chemical process under consideration. Such materials include metallic and ceramic materials of suitable temperature durability. Non-limiting examples of suitable metallic materials include, without limitation, those constructed from stainless steel, nickel-chromium-iron alloys, iron-chromium alloys, iron-chromium-aluminum alloys, copper, and aluminum. The term "ceramic" refers to inorganic non-metallic solid materials with prevalent covalent bonds, including but not limited to metallic oxides, such as oxides of aluminum, silicon, magnesium, zirconium, titanium, niobium, and chromium, as well as zeolites and titanates. Reference is made to U.S. Pat. Nos. 6,328,936 and 7,141,092, detailing layers of ultra-short-channel-length ceramic mesh comprising woven silica, both patents incorporated herein by reference.

In one exemplary embodiment, the porous mesh comprises a MICROLITH® brand ultra-short-channel-length mesh (Precision Combustion, Inc., North Haven, Conn., USA), a description of which is found, for example, in U.S. Pat. No. 5,051,241, incorporated herein by reference. Generally, the mesh comprises short channel length, low thermal mass monoliths, which contrast with prior art monoliths having longer channel lengths. For purposes of this invention, the term "ultra-short-channel-length" refers to a channel length in a range from about 25 microns (μm) (0.001 inch) to about 500 μm (0.02 inch). In contrast, the term "long channels" pertaining to prior art monoliths refers to channel lengths of greater than about 5 mm (0.20 inch) upwards of 127 mm (5 inches). In another embodiment, the channel length is no longer than the diameter of the elements from which the mesh is constructed; thus, the channel length may range from 25 μm (0.001 inch) up to about 100 μm (0.004 inch) and preferably not more than about 350 μm (0.014 inch). In view of this ultra-short channel length, the contact time of reactants with the mesh and catalyst supported thereon advantageously ranges from about 5 milliseconds (5 msec) to about 350 msec.

The porous material, preferably the MICROLITH brand ultra-short-channel-length mesh, typically comprises from about 100 to about 1,000 or more flow channels per square centimeter. More specifically, each mesh typically is configured with a plurality of channels or pores having a diameter ranging from about 0.25 millimeters (mm) to about 1.0 mm, with a void space greater than about 60 percent, preferably up to about 80 percent or more. A ratio of channel length to diameter is generally less than about 2:1, preferably less than about 1:1, and more preferably, less than about 0.5:1. MICROLITH brand meshes can be manufactured in the form of woven wire screens, woven ceramic fiber screens, pressed metal or ceramic screens; or they can be manufactured by perforation and expansion of a thin metal sheet as disclosed in U.S. Pat. No. 6,156,444, incorporated herein by reference; or alternatively manufactured by 3-D printing or by a lost polymer skeleton method.

In another exemplary embodiment, the porous material is constructed of an analogous porous structure of metal or ceramic comprising an interconnected network of solid struts defining a plurality of pores of an open-cell configuration. The pores can have any shape or diameter; but typically, a number of pores that subtend one inch designate a "pore size," which for most purposes ranges from about 5 to about 80 pores per inch. The relative density of such structures, taken as the density of the structure divided by the density of solid parent material of the struts, typically ranges from about 2 to about 15 percent. Structured porous materials are commercially available in a variety of compositions capable of withstanding the operating temperature of the reactor.

The catalytic elements support a catalyst capable of facilitating the chemical process intended to be operated within the reactor. One skilled in the art will know how to select a suitable catalyst, as the art is replete with description of specific catalysts useful for specific chemical processes. The deposition of the catalytic metal(s) onto the catalytic elements is implemented, likewise, by any method known in the art. Alternatively, finished catalysts comprising catalytic metal(s) supported on MICROLITH brand ultra-short-channel-length mesh may be obtained from Precision Combustion, Inc., North Haven, Conn.

A number of catalytic elements that are combined to form each set of catalytic elements along the reaction path can vary as desired from set to set. In one embodiment, each set of catalytic elements contains an identical number of catalytic elements, typically ranging from 1 to about 5. In another embodiment, the number of catalytic elements employed in each set varies and is selected independently from 1 to about 5 catalytic elements per set. Each catalytic element is disposed within the reaction zone such that at least one side or the entire perimeter of each element contacts an interior face of the thermally-conductive housing, so as to facilitate conductive heat transfer to or from the reactor's interior. It should be appreciated that fluids flow in a perpendicular direction to the transverse face of the mesh, that is, in parallel with the direction of minimum dimension.

Each heat transfer element comprises at least one porous, thermally-conductive material substantially lacking catalytic activity. Each heat transfer element further comprises a second inlet side and a second outlet side for the purposes of fluid flow. The term "porous" means that each heat transfer element comprises a plurality of pores or channels extending from the second inlet side to the second outlet side sufficient to provide flow through of reactant and product fluids. In one embodiment, the porous heat transfer element has an ultra-short-channel-length ranging from about 25 microns ($\mu$m) to about 500 microns ($\mu$m) in length, with optionally, a pore density ranging from about 100 pores per square inch (ppi) to about 1,000 ppi. One such embodiment thereof is illustrated by the MICROLITH brand ultra-short-channel-length mesh described hereinabove (Precision Combustion, Inc.). In another embodiment, the porous material has a channel length ranging from about 50 microns ($\mu$m) up to about 25 millimeters (mm) in length. This embodiment is illustrated by a honeycomb monolith or similar monolith structure with square, rectangular, hexagonal, circular or ellipsoidal passageways, or some combination thereof.

The term "thermally-conductive", as it pertains to the housing and the heat transfer elements, refers to any material capable of conductive solid-to-solid heat transfer at an acceptably efficient rate. The skilled person will recognize that such thermally conductive materials include metallic elements; however, ceramic materials may also be suitably thermally conductive at temperatures above about 1,000° C. Non-limiting examples of suitable metallic materials include copper, aluminum, titanium, niobium, and standard and high temperature stainless steels, iron-chromium alloys, iron-chromium-aluminum alloys including FeCrAlY, and nickel-chromium-aluminum alloys including NiCrAlY. Non-limiting examples of suitable ceramic materials include alumina, silica, zirconia, titania, and mixtures thereof as well as mullite, cordierite and other alumina-silica compositions with or without magnesia, and further optionally containing yttria and/or lanthana, as well as ceria-zirconia ceramics.

As defined previously herein, the phrase "substantially lacking catalytic activity" means that the heat transfer elements, irrespective of whether or not they contain quantities of catalyst, do not exhibit sufficient catalytic activity in the subject chemical process so as to influence conversion of reactants or selectivity to products. In one embodiment, essentially no catalyst is present on the heat transfer elements, and catalytic activity from the heat transfer elements is non-detectable. In another embodiment, catalyst is present on the heat transfer elements but in a non-effective quantity, typically on the order of less than 0.5 percent by weight, and preferably, less than about 0.05 percent by weight, such that catalytic facilitation of conversion and yield is less than about 2 percent, preferably, less than about 1 percent.

The number of porous, thermally conductive materials in each set of heat transfer elements can vary within each set and along the reaction path, depending upon the quantity of heat needed to be input to or removed from the reaction zone. In one embodiment, each set of heat transfer elements comprises one monolithic structure (e.g., honeycomb). In another embodiment, each set of heat transfer elements comprises from 1 to 5 monolithic structures. In yet another embodiment, each set of heat transfer elements is comprised of a selected number of layers of mesh ranging from 1 to about 5. The thickness of the monolithic structure or the number of layers can be identical or variable from set to set, as desired. Each heat transfer element is disposed in the catalytic reactor such that at least one side or the entire perimeter of the heat transfer element contacts the interior face of the thermally conductive housing, so as to facilitate heat transfer into or out of the reaction zone. It should be appreciated that fluid flows in a direction perpendicular to the transverse face of each heat transfer element; that is, fluid flow is primarily in a direction parallel to the axis of least dimension of the heat transfer element.

The skilled person will appreciate that the thickness of each set of catalytic elements relative to the thickness of each set of heat transfer elements depends upon the quantity of heat needed to be transmitted into or out of the reaction zone, so as to maintain an essentially isothermal temperature or, alternatively, a desired temperature profile along the reaction path. For operability and as general guidance, we have found that the thickness of each catalytic element typically ranges from about 1 percent to about 100 percent of the thickness of each heat transfer element. Or, the total length occupied by the catalytic elements in a series of catalytic and heat transfer elements disposed in the reaction path is from about 1 percent to about 50 percent. The thickness of the catalytic elements, measured in the primary direction of fluid flow, ranges from about 0.003 inch (75 microns, $\mu$m) to 0.25 inch (6.3 mm), preferably from about 0.004 inch (100 $\mu$m) to 0.020 inch (500 $\mu$m), and more preferably from about 0.006 inch (150 $\mu$m) to 0.014 inch (350 $\mu$m). The thickness of the heat transfer elements, measured in the primary direction of fluid flow, ranges from about 0.003 inch (75 $\mu$m) to 1.0 inch (25 mm), preferably from about 0.06 inch (1.5 mm) to 0.50 inch (12.5 mm), and more preferably from about 0.10 inch (2.5 mm) to 0.25 inch (6.3 mm). A repeating group of catalytic and heat transfer elements can be considered to be one or more catalyst elements adjacent to one or more heat transfer elements. For example, a 0.007 inch (175 µm) thick catalyst element adjacent to two 0.125 inch (3.1 mm) heat transfer elements can be considered one repeat unit, in which case the catalyst element occupies 2.72 percent of the total length of the repeat unit. Adjacent repeat units, in either the upstream or downstream locations, can be the same repeat unit or consist of a different combination of catalyst and heat transfer elements.

It should be further appreciated that the chemical reactor of this invention does not comprise an electrical circuit that functionally feeds electricity into the catalytic elements or heat transfer elements. Accordingly, no electrical resistive heating is provided or occurs within the reaction zone of this reactor and its associated catalytic and heat transfer elements. Rather, the chemical reactor of this invention is heated or cooled passively through conduction of heat, respectively, into or out of the heat transfer elements intercalated along the catalytic reaction pathway. The reactor is particularly suitable for use in endothermic chemical reactions that obtain their required heat from an external conventional furnace or from an external solar powered furnace. In the latter, solar heat is collected and concentrated via an arrangement of mirrors and then transferred via conduction into the reaction zone of the chemical reactor.

Alternatively, the catalytic reactor of this invention is useful in exothermic chemical processes, where heat released in the chemical process is transported facilely away from the reaction zone via the heat transfer elements, while over-heating of the reactor is minimized. Moreover, catalyst activity functions close to optimum via temperature control by the internal heat transfer elements. This is especially true for reactions involving oxygen ($O_2$), carbon monoxide (CO), carbon dioxide ($CO_2$), and hydrogen ($H_2$), including Fischer-Tropsch syntheses to produce paraffinic hydrocarbons in a range of $C_1$ to $C_{24}$ or higher, as shown in Eqn. 6 hereinbefore. This reaction is highly exothermic; the heat released by the reaction can result in undesired reactor overheating or thermal runaway situations, according to C. Visconti et. al., Appl. Catal. A Vol. 370 (2009), p. 93, or C. Perego, R. Bortolo, and R. Zennaro, Catal. Today, Vol. 142 (2009), p. 9. Use of the reactor according to this invention overcomes the prior limitations, enabling improved conversion of reactants even at higher reaction temperatures.

Through experimental testing of exothermic processes, we have found in some embodiments that the use of the heat transfer elements increases the temperature at the inlet of the reactor and decreases the temperature at the outlet of the reactor while increasing overall conversion. In other embodiments, we have found that the use of the heat transfer elements increases the temperature at the inlet and the outlet of the reactor while only slightly decreasing conversion. The actual outcome depends upon the intrinsic exothermicity of the process as well as the number of catalytic elements versus the number of heat transfer elements employed. In any case, it should be appreciated that the use of heat transfer elements in accordance with this invention reduces large and unacceptable exothermic spikes in temperature.

While not bound to any theory or mechanism, the chemical reactor of this invention is designed to enable isothermal or close-to-isothermal conditions within the catalytic elements. Sufficient thermal energy is provided, via conduction through the heat transfer elements, to balance the rate of heat removal due to the catalytic reactions. For an endothermic chemical reaction, occurring in the volume occupied by the catalytic elements, heat is supplied sufficient to balance the rate of heat removal due to the reaction. Similarly, for an exothermic chemical, heat of reaction is removed via conduction through the heat transfer elements to a volume external to the reactor. Enabling isothermal operation avoids operating the catalyst elements at excessively low temperatures which would otherwise reduce volumetric reaction rates, even beyond what would occur if all of the heat transfer elements were replaced by catalytic elements. In other words, the reactor of this invention with alternating catalytic and heat transfer elements results in higher volumetric productivity, as compared to an identically-sized reactor without heat transfer elements, and also results in a significant reduction and cost savings due to reduced catalyst use.

One skilled in the art will appreciate that one goal of the present invention is to balance the location and volume occupancy of the heat transfer elements to account for required heat transfer in order to maintain essentially all catalytic elements at nearly the same temperature regardless of location within the reactor. In one embodiment the arrangement of catalytic to heat transfer elements is regular and periodic; in another embodiment gradients in volume occupancy occur from one end to the other within the reactor, for example, increase and then decrease, or decrease then increase, or occur in non-regular fashion. In yet another embodiment, variations occur from tube to tube in a multitube catalytic reactor of this invention. The aforementioned embodiments and variations depend upon the extent of energy needed to be input or removed from the catalytic elements, and on the rates of conductive heat transfer from external to the reactor walls or thermally conductive housing, and thence to or from the heat transfer elements; as well as depending upon the rate of convective heat transfer to or from the heat transfer elements by the reactant, diluent and product fluid flowing through the reactor to the catalytic elements. These embodiments and arrangement variations are suitable for reactors with circular, ellipsoidal, square, rectangular, hexagonal, or other shapes, in cross section perpendicular to the primary fluid flow direction. Likewise, any number of reactors of this subject invention design can be disposed inside a multi-reactor vessel. The reactor(s) can be externally heated or cooled by heat transfer fluids, by air or other fluid flow via forced or natural convection, by steam generation or condensation, other condensable fluids, by external exothermic or endothermic reactions, by radiation either photonic or radioactive, or by other means of heating or cooling of objects as practiced in industrial processes.

Under operating conditions, the reactor of this invention functions substantially isothermally. This means that the rate of heat generation or consumption by essentially all catalytic elements contained in the reactor, for either exothermic or endothermic reactions respectively, is balanced by conduction, either out of or into the reactor by the heat transfer elements, so as to maintain essentially all catalytic elements at substantially the same operating temperature. Specifically, a maximum variation between catalyst elements should be no more, and is found to be no more, than about 10 percent, as measured in absolute temperature terms (i.e. Kelvin or Rankine), with a variation of less than 5 percent preferred.

EMBODIMENTS

Example 1 (E-1)

A catalytic reactor of this invention was constructed in accordance with FIG. 1, comprising a plug flow reactor with specific internal structures featured in this invention. The plug flow reactor consisted of a stainless steel housing of tubular shape (1.1 inch, 27.5 mm I.D.), having disposed therein 26 porous catalytic elements in the form of screens having a length in the direction of flow of 0.007 inch (175 µm) (MICROLITH brand mesh, Precision Combustion, Inc., North Haven, Conn.). The tube was open at both ends providing for an inlet and an outlet and an axial flow path along the length of the tube from inlet to outlet. Each catalytic screen consisted of expanded iron-chromium alloy coated with an alumina washcoat (20 mg/in$^2$ areal loading) covered with a dispersion of metallic rhodium (2 mg/in$^2$ areal loading). Each screen was cut into a circle (27.5 mm dia.) and disposed along the inner volume of the tube. Interspersed between each pair of 2 catalytic screens was disposed two heat transfer elements, each heat transfer element consisting of a porous thermally conductive monolith (Indy Honeycomb, Covington, Ky., of 0.125 inch (3.13 mm) thickness with 95 percent open area in the flow direction) constructed of Haynes alloy 214 having no washcoat or catalyst supported thereon. The heat transfer elements were thermally conductive in a radial direction from the tube's outer wall inward. They were also porous in the axial direction and caused little resistance to flow through the tube. The catalytic reactor was fitted within a conventional furnace wherein the reactor was heated passively via conduction. The total length of catalyst elements and heat transfer elements was 6.432 inches (16.3 cm), of which 2.82 percent of the total length and volume was occupied by the catalytic elements.

Figure 3:
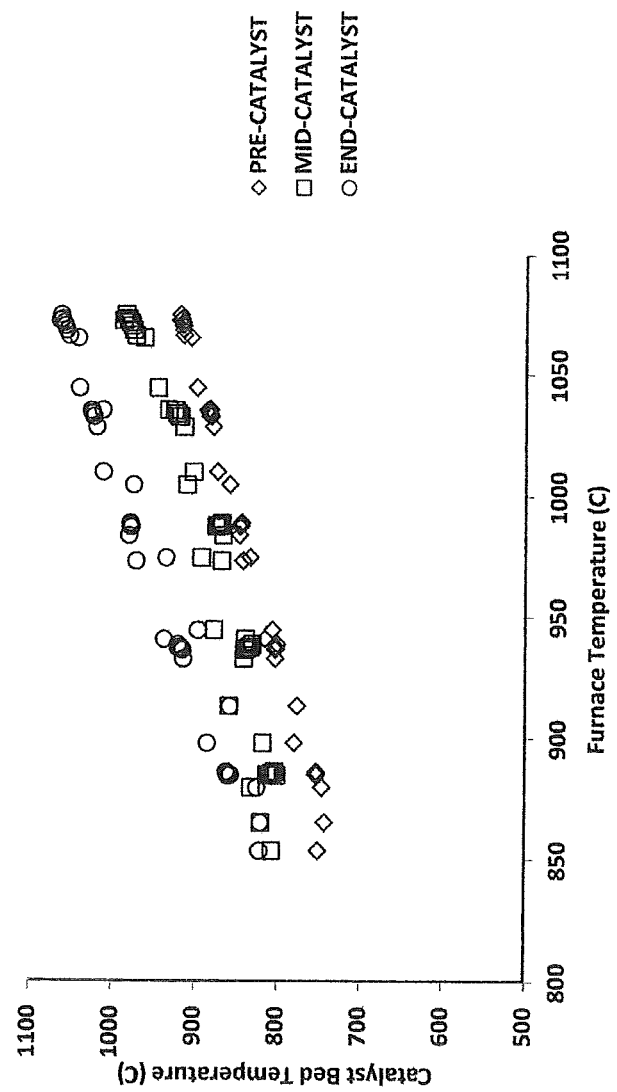
FIG. 3 depicts a graph of Catalyst Bed Temperature versus Furnace Temperature for an embodiment of the catalytic reactor of this invention operating under endothermic first reforming process conditions.
Figure 5:
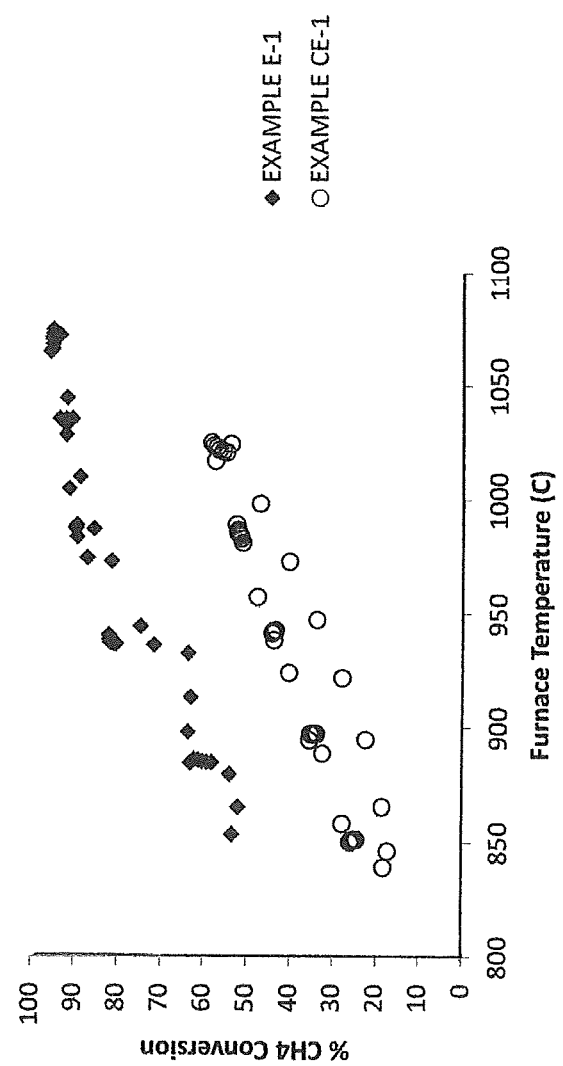
FIG. 5 depicts a graph of Methane Conversion versus Furnace Temperature for the embodiment of the invention depicted in FIG. 3. For comparative purposes, data are also presented for the conventional process depicted in FIG. 4.

The dry reformation of carbon dioxide was conducted in accordance with Eqn. 1 hereinabove. A mixture of reaction gases comprising methane (1 standard liter per minute, 1 slpm) and carbon dioxide (1 slpm) and nitrogen (0.5 slpm) was flowed through the heated tube from inlet to outlet. Nitrogen, which is inert, was included in the gas stream to calibrate a gas chromatograph for product evaluation. Thermocouples were placed in three locations: (a) at the reactor entry, (b) at the midpoint in the reaction zone, and (c) at the reactor exit. FIG. 3 provides a graph of Catalyst Bed Temperature as a function of Furnace Temperature. FIG. 5 provides a graph of Methane Conversion versus Furnace Temperature.

Comparative Experiment (CE-1)

For comparative purposes, a conventional reactor was constructed similar to the plug flow reactor of Example E-1 with the exception that the non-catalytic heat transfer elements were omitted. All 26 catalytic elements (mesh sheets) were close-packed together against each other. The reformation of carbon dioxide was conducted under process conditions identical to those described in E-1 with the results shown in FIG. 4 plotting Catalyst Bed Temperature versus Furnace Temperature and FIG. 5 plotting Methane Conversion versus Furnace Temperature.

Figure 4:
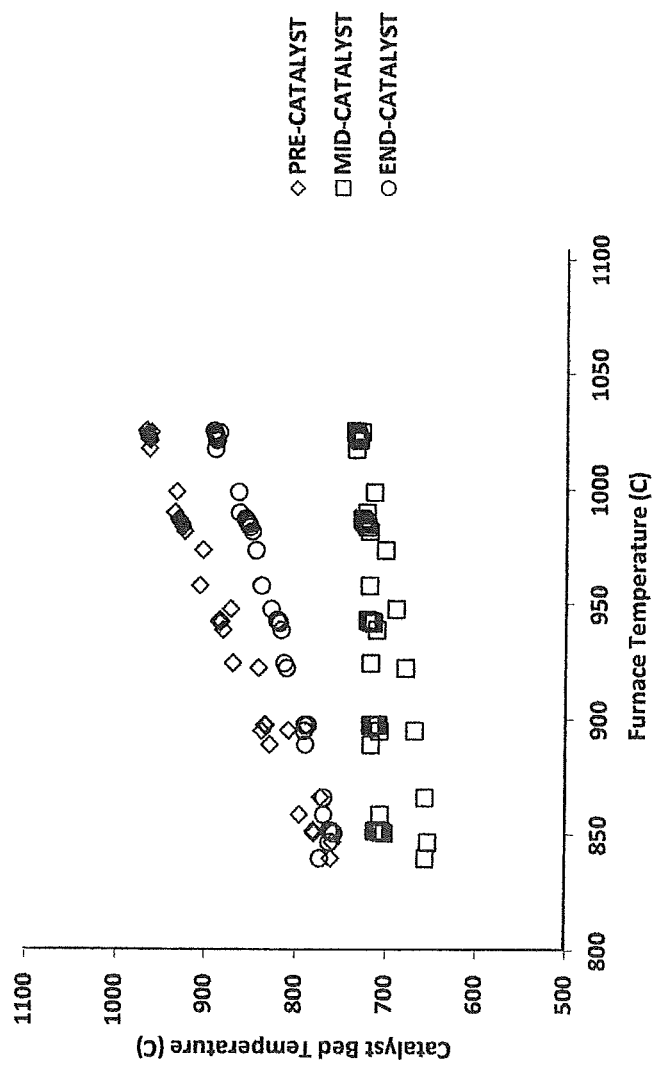
FIG. 4 depicts a graph of Catalyst Bed Temperature versus Furnace Temperature for a conventional reactor of close-packed catalytic screens operating under endothermic first reforming process conditions.

When FIG. 3 of E-1 was compared with FIG. 4 of CE-1, it was found that the catalyst bed temperatures were overall lower for the conventional close-packed screens, as compared with the reactor of the invention. In fact, the mid-bed temperature dropped significantly for the close-packed screens of CE-1; while the invention design E-1 maintained a higher mid-bed temperature. At the temperatures observed in the conventional reactor, significant carbon formation occurred, as seen on examining the conventional reactor at the completion of the test. In fact, the reforming process in the conventional reactor ceased to function due to carbon formation. In contrast, the reactor of the invention of E-1 provided for higher temperatures throughout the catalyst bed, including the mid-bed temperature, as well as a higher conversion of methane, FIG. 5, enabling long run times exceeding 4 days without catalyst degradation, and essentially no carbon formation upon inspection at the test's end.

Example 2 (E-2)

Figure 8:
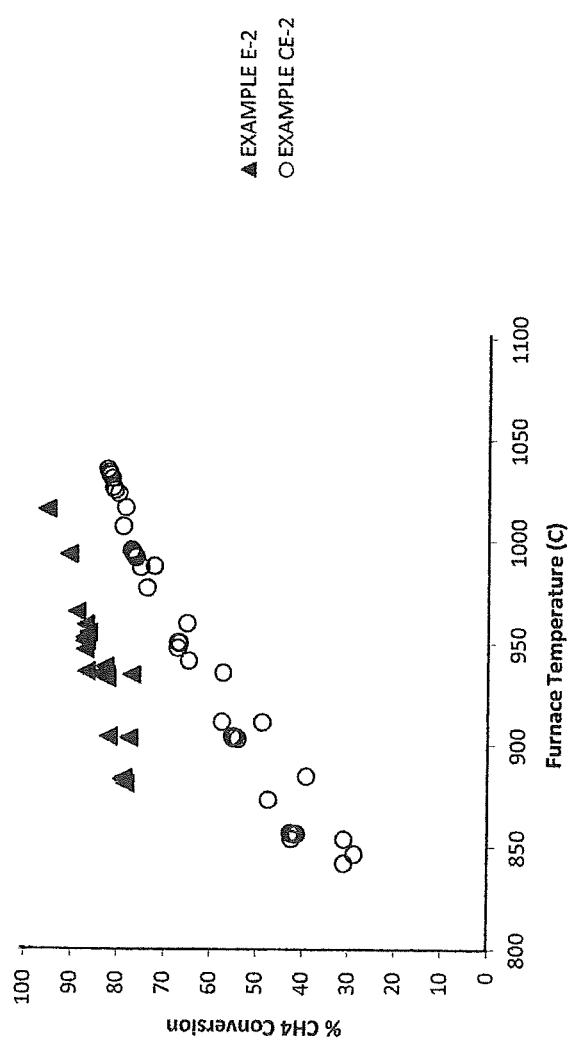
FIG. 8 depicts a graph of Methane Conversion versus Furnace Temperature for the embodiment of this invention depicted in FIG. 6. For comparative purposes, data are presented for the conventional process depicted in FIG. 7.

Example E-1 was repeated, with the exception that the flow rates were adjusted to the following: 0.5 slpm methane, 0.5 slpm carbon dioxide, and 0.25 slpm nitrogen. Results are presented in FIGS. 6 and 8.

Comparative Experiment 2 (CE-2)

Comparative Experiment CE-1 was repeated, with the exception that the flow rates were adjusted to those used in Example 2, namely, 0.5 slpm methane, 0.5 slpm carbon dioxide, and 0.25 slpm nitrogen. Results are presented in FIGS. 7 and 8.

Figure 6:
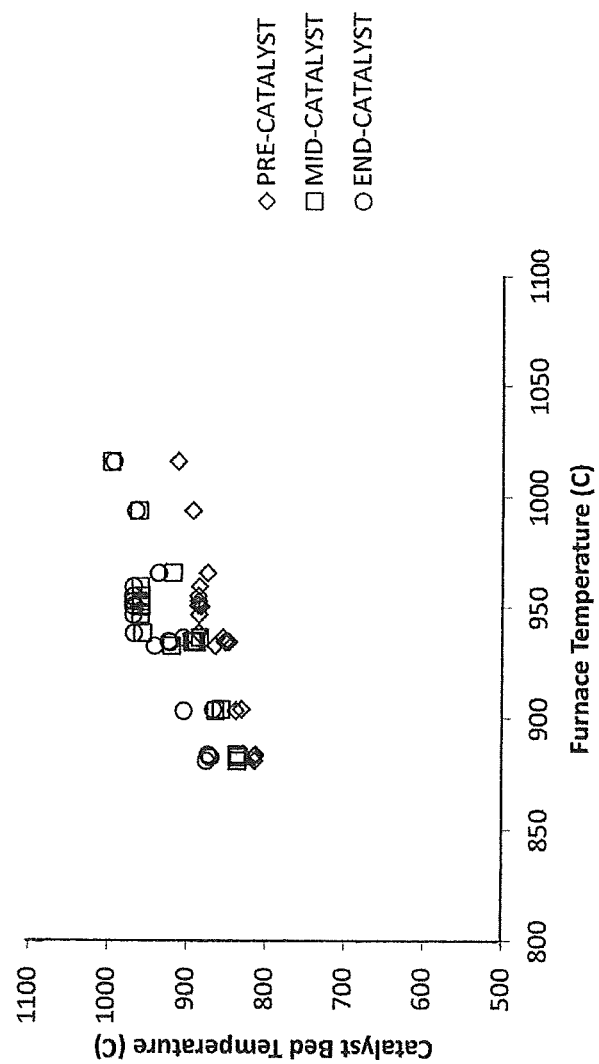
FIG. 6 depicts a graph of Catalyst Bed Temperature versus Furnace Temperature for the embodiment of the catalytic reactor of this invention operating under endothermic second reforming process conditions.
Figure 7:
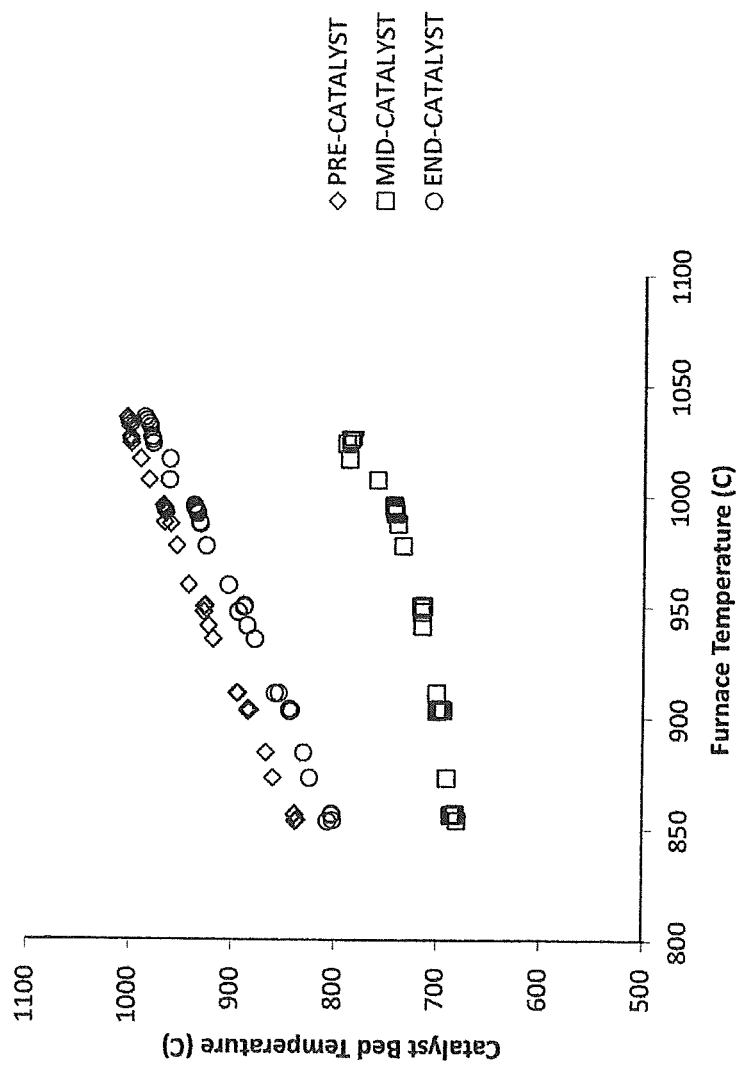
FIG. 7 depicts a graph of Catalyst Bed Temperature versus Furnace Temperature for the conventional reactor operating under endothermic second reforming process conditions.

When FIG. 6 of E-2 was compared with FIG. 7 of CE-2, it was found that the catalyst bed temperatures were overall lower for the conventional close-packed screens (CE-2), as compared with the reactor of the invention (E-2). In fact, the mid-bed temperature dropped significantly for the close-packed screens; while the invention design maintained a higher mid-bed temperature. At the temperatures observed in the conventional reactor, significant carbon formation occurred, as was seen on examining the conventional reactor at the completion of the test. In contrast, the apparatus of the invention provided for higher temperatures throughout the catalyst bed, a higher conversion of methane, FIG. 8, long run times without catalyst degradation, and essentially no carbon formation upon inspection at the test's end.

Example 3 (E-3)

Figure 11:
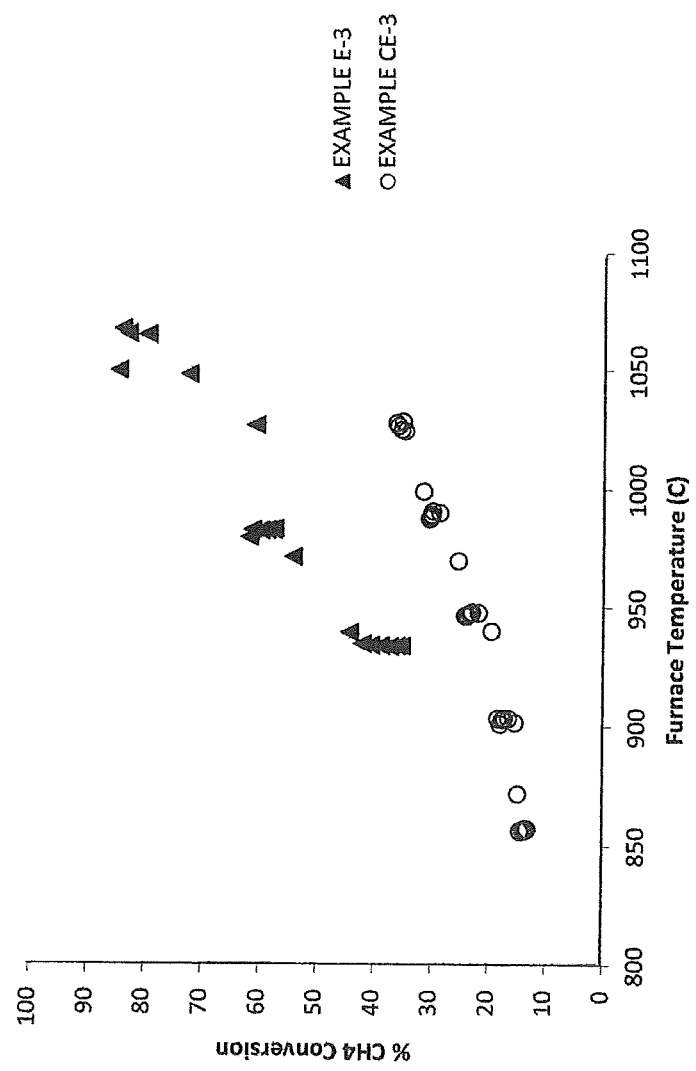
FIG. 11 depicts a graph of Methane Conversion versus Furnace Temperature for the embodiment of this invention depicted in FIG. 9. For comparative purposes, data are presented for the conventional reactor depicted in FIG. 10.

Example E-1 was repeated with the exception that flow rates were adjusted to the following: 2.0 slpm methane, 2.0 slpm carbon dioxide, and 1.0 slpm nitrogen. Results are presented in FIGS. 9 and 11.

Comparative Experiment 3 (CE-3)

Comparative Experiment CE-1 was repeated with the exception that flow rates were adjusted to those used in Example E-3, namely, 2.0 slpm methane, 2.0 slpm carbon dioxide, and 1.0 slpm nitrogen. Results are presented in FIGS. 10 and 11.

Figure 9:
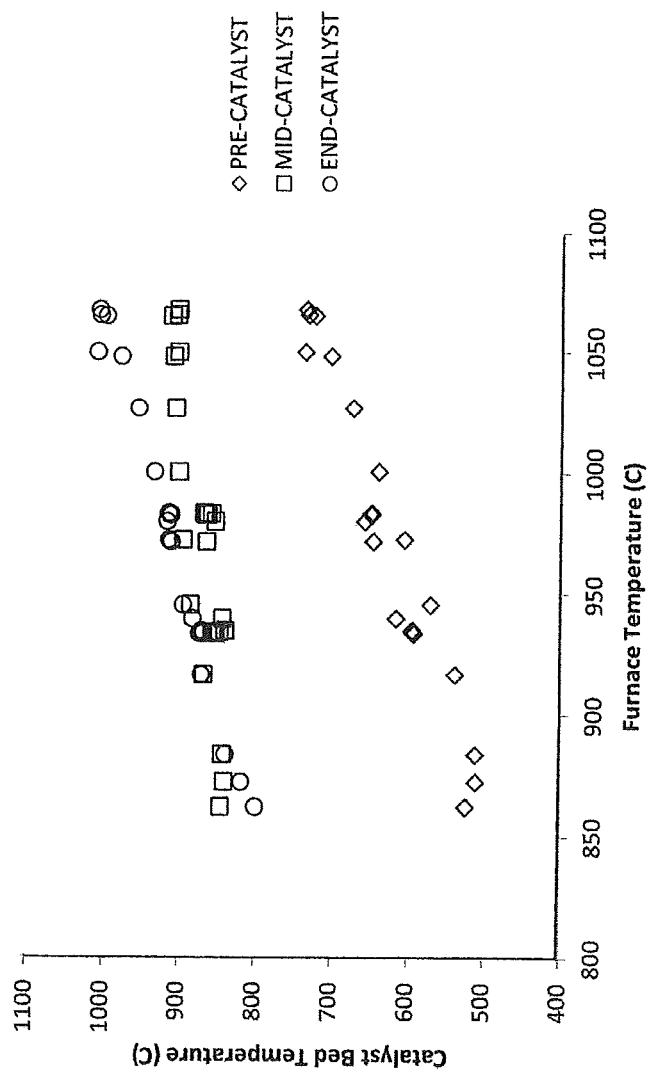
FIG. 9 depicts a graph of Catalyst Bed Temperature versus Furnace Temperature for the embodiment of the catalytic reactor of this invention operating under endothermic third reforming process conditions.
Figure 10:
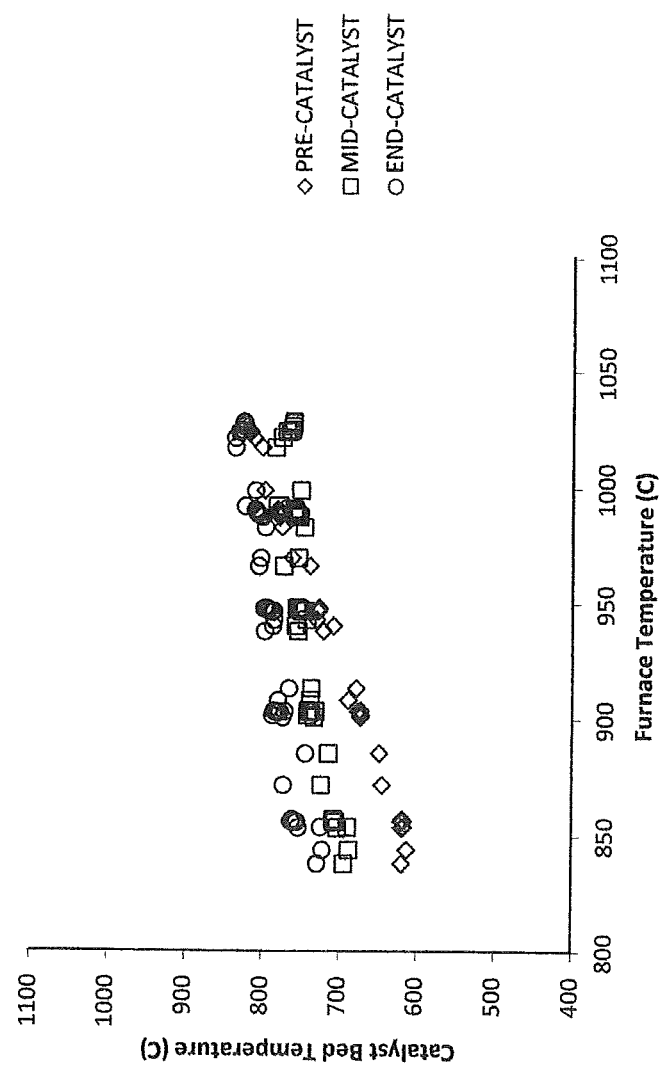
FIG. 10 depicts a graph of Catalyst Bed Temperature versus Furnace Temperature for the conventional reactor operating under third endothermic reforming process conditions.

When FIG. 9 of E-3 was compared with FIG. 10 of CE-3, it was found that the catalyst bed temperatures were overall lower for the conventional close-packed screens (CE-3), as compared with the reactor of the invention (E-3). At the temperatures observed in the conventional reactor, significant carbon formation occurred. In contrast, the apparatus of the invention provided for higher temperatures throughout the catalyst bed, a higher conversion of methane, FIG. 11, long run times without catalyst degradation, and essentially no carbon formation upon inspection at the test's end.

The catalytic reactor of this invention is also useful in exothermic chemical processes such that heat released in the chemical process is transported facilely away from the reaction zone, while over-heating of the reactor is minimized. Moreover, catalyst activity functions close to optimum via temperature control by the internal heat transfer elements. This is especially true for reactions involving carbon monoxide (CO), carbon dioxide ($CO_2$), and hydrogen ($H_2$), including Fischer-Tropsch syntheses to produce non-oxygen containing olefins and paraffins.

Example 4 (E-4)

A reactor similar to the reactor described in Example 1 and FIG. 1 was tested in an exothermic Fischer-Tropsch synthesis of a reactant mixture of CO and $H_2$ combined to form paraffinic hydrocarbons in the range of $C_1$ to $C_{24}$, as illustrated in Eqn. 6 hereinabove. The reactor of tubular shape was loaded with 100 catalytic elements comprising screens (each 1.0 inch (25 mm) diameter and 0.007 inch (175 μm) thickness), coated in total with alumina ($Al_2O_3$; 1.58 g) onto which was placed a mixture of iron (316 mg) and platinum (15.8 mg). The screens were interspersed in a regular pattern with honeycomb heat transfer elements (0.125 inch/3.13 mm thick). The catalytic screens and heat transfer elements were similar to those used in Example 1, but with a different catalyst coating on the catalytic screens. The stacking unit employed consisted of one heat transfer element and then four catalytic screens, repeated until all 100 screens were loaded, with one additional heat transfer element at the outlet. The catalytic screens occupied 11 percent of the total length and volume in the reactor.

The reactor thusly constructed was pretreated at atmospheric pressure via heating in a hydrogen ($H_2$) flow at 415° C. for 4 hours, then cooled to room temperature in flowing nitrogen ($N_2$), followed by passivation with air at room temperature and not allowing the catalyst center bed temperature to exceed 100° C. The reaction was then operated at an outlet pressure of 20 atm, inlet reactant flows of 0.279 liters/min $H_2$, 0.139 liters/min CO, and 0.1 liters/min $N_2$, with gas flow rates given at reference conditions of 1 atm and 21.1° C., and over a range of operating temperatures in order to study the impact of temperature on performance. Reactor temperatures, measured after 50 catalytic elements (mid-point) and after the last heat transfer element (end), and product flow rates are presented in Table 1 below.

TABLE 1

| mid (° C.) | end (° C.) | CH4 (mol/hr) | C2H4 (mol/hr) | C2H6 (mol/hr) | C3H8 (mol/hr) | C4's (mol/hr) |
|---|---|---|---|---|---|---|
| 170 | 148 | 0.0 | 0.0 | 0.0 | 0.0 | 0.0 |
| 183 | 158 | 0.0 | 0.0 | 0.0 | 0.0 | 0.0 |
| 204 | 179 | 0.0 | 0.0 | 0.0 | 0.0 | 0.0 |
| 226 | 191 | 1.7 | 0.3 | 0.2 | 0.0 | 0.0 |
| 248 | 209 | 5.9 | 0.8 | 0.8 | 0.0 | 0.0 |
| 266 | 228 | 17.1 | 1.9 | 3.0 | 0.0 | 0.0 |
| 280 | 243 | 28.5 | 2.7 | 5.6 | 0.0 | 0.0 |
| 291 | 247 | 36.8 | 3.1 | 7.7 | 0.0 | 3.1 |
| 299 | 247 | 53.7 | 4.1 | 12.3 | 0.0 | 17.3 |
| 312 | 261 | 88.0 | 6.1 | 21.7 | 0.0 | 23.6 |

The results of Table 1 show that even at high temperatures, conversion of CO and $H_2$ to useful products increases, and that no thermal runaway temperatures are observed. Contrarily, the reactor was highly effective in rejecting the heat of reaction as end temperatures are less than mid reactor temperatures, enabling the reactor to operate within safe limits and with increasing productivity to desirable products with increasing temperatures. Specifically, mid and end temperatures of 312° C. and 261° C. result in an 8.7 percent temperature difference, 585K vs. 534K; at the lowest temperatures, the difference is 4.97 percent (170° C./443K vs. 148° C./421K).

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A catalytic reactor comprising a thermally-conductive housing having disposed therein the following structures:
    (a) a plurality of catalytic elements, each catalytic element comprising a porous material having a catalyst supported thereon; each catalytic element further comprising a first flowpath from a first inlet side to a first outlet side;
    (b) a plurality of heat transfer elements, each heat transfer element comprising a porous, thermally-conductive material substantially lacking catalytic activity; each heat transfer element further comprising a second flowpath from a second inlet side to a second outlet side; and
    further wherein the plurality of catalytic elements and the plurality of heat transfer elements are disposed within the thermally-conductive housing in an alternating configuration defining a unitary serial fluid flow path from each element inlet side to each element outlet side.

2. The catalytic reactor of claim 1 wherein under operating conditions, the reactor functions via passive thermal conduction into or out of the heat transfer elements.

3. The catalytic reactor of claim 2 wherein under operating conditions, the reactor operates essentially isothermally within the plurality of catalytic elements.

4. The catalytic reactor of claim 2 further defined as having no electrical leads that provide resistive heating to the plurality of catalytic elements and the plurality of heat transfer elements.

5. The catalytic reactor of claim 1 wherein under operating conditions fluid flows in a direction perpendicular to a transverse face of each of the plurality of catalytic elements and each of the plurality of heat transfer elements.

6. The catalytic reactor of claim 1 wherein each of the plurality of catalytic elements is independently selected from metallic and ceramic materials.

7. The catalytic reactor of claim 6 wherein each of the plurality of catalytic elements is provided in the form of a mesh.

8. The catalytic reactor of claim 7 wherein the mesh has an ultra-short-channel-length ranging from 25 microns to 500 microns.

9. The catalytic reactor of claim 7 wherein the mesh comprises from 100 to 1,000 flow channels per square centimeter.

10. The catalytic reactor of claim 6 wherein each of the plurality of catalytic elements comprises a structured material having from 5 to 80 pores per inch.

11. The catalytic reactor of claim 1 wherein each of the plurality of catalytic elements comprises a set of catalytic elements having from 1 to 5 catalytic elements per set.

12. The catalytic reactor of claim 1 wherein the catalyst supported on the plurality of catalytic elements is selected from a dry reforming catalyst or a Fisher-Tropsch catalyst.

13. The catalytic reactor of claim 1 wherein each of the plurality of heat transfer elements is independently selected from monolithic honeycombs and ultra-short-channel-length meshes.

14. The catalytic reactor of claim 13 wherein the monolithic honeycomb has a channel length ranging from 50 microns to 25 millimeters; or alternatively, the mesh has an ultra-short channel-length ranging from 25 microns to 500 microns.

15. The catalytic reactor of claim 13 wherein each of the plurality of heat transfer elements is provided in a metallic composition.

16. The catalytic reactor of claim 13 wherein each of the plurality of heat transfer elements comprises a set of heat transfer elements having from 1 to 5 heat transfer elements per set.

17. The catalytic reactor of claim 13 wherein each of the plurality of heat transfer elements comprises no catalyst, or alternatively, each of the plurality of heat transfer elements comprises a catalyst in an amount less than 0.5 percent, based on a total weight of the heat transfer elements, so as to facilitate less than 1 percent additional conversion and yield under operating conditions.

18. The catalytic reactor of claim 1 wherein a thickness of each catalytic element ranges from 1 percent to 100 percent of a thickness of each heat transfer element.

19. The catalytic reactor of claim 1 wherein a total length occupied by the plurality of catalytic elements ranges from 1 percent to 50 percent of a total length of the catalytic elements and the heat transfer elements in the catalytic reactor.

20. The catalytic reactor of claim 1 wherein a thickness of a set of catalytic elements ranges from 75 microns to 6.3 millimeters, and a thickness of a set of heat transfer elements ranges from 75 microns to 25 millimeters, both measured in a direction of fluid flow from an inlet side to an outlet side.

21. A process of conducting an endothermic chemical reaction comprising:
   (a) providing a catalytic reactor comprising a thermally-conductive housing having disposed therein the following structures:
   (a) (i) a plurality of catalytic elements, each catalytic element comprising a porous material having a catalyst supported thereon; each catalytic element further comprising a first flowpath from a first inlet side to a first outlet side;
   (a) (ii) a plurality of heat transfer elements, each heat transfer element comprising a porous, thermally-conductive material substantially lacking catalytic activity; each of the plurality of heat transfer elements further comprising a second flowpath from a second inlet side to a second outlet side; and
   (a) (iii) further wherein the plurality of catalytic elements and the plurality of heat transfer elements are disposed within the thermally-conductive housing in an alternating configuration defining a unitary serial fluid flow path from each element inlet side to each element outlet side;
   (b) providing heat to the heat transfer elements conductively through the thermally conductive housing, so as to transfer heat to the catalytic elements;
   (c) feeding a reactant stream through the unitary serial fluid flow path from each element inlet side to each element outlet side; and
   (d) contacting the reactant stream with the catalyst as the reactant stream passes through the plurality of catalytic elements, the contacting occurring under process conditions sufficient to produce a product stream.

22. The process of claim 21 wherein the endothermic reaction is selected from any one of the processes below and combinations of such processes:
   Dry Reforming: $CO_2+CH_4 \rightarrow 2H_2+2CO$
   Reverse water gas shift: $CO_2+H_2 \rightarrow CO+H_2O$
   Methane steam reforming: $CH_4+H_2O \rightarrow CO+3H_2$
   Steam reforming of hydrocarbons: $C_nH_m+nH_2O \rightarrow nCO+(n+m/2)H_2$
   and Carbon dioxide reforming of hydrocarbons: $C_nH_m+nCO_2 \rightarrow 2nCO+(m/2)H_2$.

23. A method of conducting an exothermic reaction comprising:
   (a) providing a catalytic reactor comprising a thermally-conductive housing having disposed therein the following structures:
   (a) (i) a plurality of catalytic elements, each catalytic element comprising a porous material having a catalyst supported thereon; each of the plurality of catalytic elements further comprising a first flowpath from a first inlet side to a first outlet side;
   (a) (ii) a plurality of heat transfer elements, each heat transfer element comprising a porous, thermally-conductive material substantially lacking catalytic activity; each of the plurality of heat transfer elements further comprising a second flowpath from a second inlet side to a second outlet side; and
   (a) (iii) further wherein the plurality of catalytic elements and the plurality of heat transfer elements are disposed within the thermally-conductive housing in an alternating configuration defining a unitary serial fluid flow path from each element inlet side to each element outlet side;
   (b) feeding a reactant stream through the unitary serial fluid flow path from each element inlet side to each element outlet side;
   (c) contacting the reactant stream with a catalyst as the reactant stream passes through the plurality of catalytic elements, the contacting occurring under process conditions sufficient to produce a product stream and a heat of reaction; and
   (d) transferring the heat of reaction to the plurality of porous thermally conductive heat transfer elements and thence to the thermally conductive housing, so as to remove heat from the reactor.

24. The process of claim 23 wherein the exothermic reaction comprises a Fisher-Tropsch reaction, such that the reactant stream comprises hydrogen and carbon monoxide and the product stream comprises a mixture of C1-24+ liquid hydrocarbons.

* * * * *